United States Patent [19]

Shieh

[11] Patent Number: 5,507,160
[45] Date of Patent: Apr. 16, 1996

[54] LOCKING DEVICE FOR DISK BRAKE

[76] Inventor: Jin-Ren Shieh, No. 178, Shih Chia Road, Taichung, Taiwan

[21] Appl. No.: 421,684

[22] Filed: Apr. 13, 1995

[51] Int. Cl.$^6$ ................................................ E05B 71/00
[52] U.S. Cl. ................................ 70/233; 70/34; 70/441; 70/DIG. 49
[58] Field of Search ........................... 70/33, 34, 233, 70/225, 226, 441, 432–434, DIG. 49; 188/265, 353; 303/89

[56] References Cited

U.S. PATENT DOCUMENTS

| | | | |
|---|---|---|---|
| 599,245 | 2/1898 | Merrill | 70/33 |
| 2,818,475 | 12/1957 | Harry | 70/DIG. 49 X |
| 3,810,145 | 5/1974 | Gusaras | 70/DIG. 49 X |
| 4,546,345 | 10/1985 | Naito | 70/DIG. 49 X |
| 5,023,596 | 6/1991 | Sirman et al. | 70/233 X |
| 5,127,244 | 7/1992 | Myers | 70/34 X |
| 5,265,451 | 11/1993 | Phifer | 70/233 X |
| 5,291,761 | 3/1994 | Lii | 70/233 X |
| 5,365,758 | 11/1994 | Shieh | 70/33 |
| 5,379,618 | 1/1995 | Shieh | 70/33 |
| 5,404,735 | 4/1995 | Hsieh | 70/441 X |

FOREIGN PATENT DOCUMENTS

| | | | |
|---|---|---|---|
| 413065 | 2/1991 | European Pat. Off. | 70/233 |
| 2913010 | 10/1980 | Germany | 40/201 |
| 8300899 | 10/1984 | Netherlands | 70/233 |

*Primary Examiner*—Steven N. Meyers
*Assistant Examiner*—Suzanne L. Dino
*Attorney, Agent, or Firm*—Connolly & Hutz

[57] ABSTRACT

A locking device for locking a brake disk includes a slot formed in a body which includes a groove for receiving a shank and a chamber for receiving a housing. A circuit board is engaged in the housing and includes a switch. A stud is slidably engaged between the shank and the switch. The stud is disengaged from the switch when the stud is engaged in the recess of the shank, and the stud is forced toward the switch in order to depress the switch when the stud is disengaged from the shank and when the shank is engaged inward of the body so as to lock the brake disk in place.

5 Claims, 4 Drawing Sheets

5,507,160

LOCKING DEVICE FOR DISK BRAKE

BACKGROUND OF THE INVENTION

1. Field of the Invention

The present invention relates to a locking device, and more particularly to a locking device for locking a disk brake of motor vehicles.

2. Description of the Prior Art

The closest prior art of which applicant is aware is his prior U.S. Pat. No. 5,379,618 to Shieh, filed on Apr. 29, 1993, entitled "LOCKING DEVICE ESPECIALLY FOR USE IN LOCKING DISK BRAKE OF MOTOR CYCLE". The patent provides a locking device for locking the disk brake only.

The present invention has arisen to mitigate and/or obviate the afore-described disadvantages of the conventional locking devices.

SUMMARY OF THE INVENTION

The primary objective of the present invention is to provide a locking device which includes a sounding means for generating a warning sound when the locking device is opened by an unauthorized person.

In accordance with one aspect of the invention, there is provided a locking device for locking a brake disk comprising a body including a slot for engaging with the brake disk, a channel formed beside the slot and communicating with the slot, a groove and a chamber formed therein, the chamber communicating with the channel, a shank means engaged in the groove and including a recess formed therein, a cap engaged in the channel and including at least one orifice formed therein, a housing engaged in the chamber, a circuit board engaged in the housing and including a switch, a stud slidably engaged in the body and located between the shank means and the switch, and means for biasing the stud to engage with the recess of the shank means. The stud is disengaged from the switch when the stud is engaged in the recess of the shank means, and the stud is forced toward the switch in order to depress the switch when the stud is disengaged from the shank means and when the shank means is engaged inwardly of the body so as to lock the brake disk in place.

The cap includes an annular rib extended toward the chamber, the housing includes a cover secured thereto, the cover includes an annular space formed therein for engaging with the annular rib so as to form a tortuous passage.

The housing includes an opening aligned with the switch and includes a diaphragm engaged in the opening so as to enclose the opening.

A sealing ring is engaged between the housing and the body so as to form a water tight seal therebetween.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
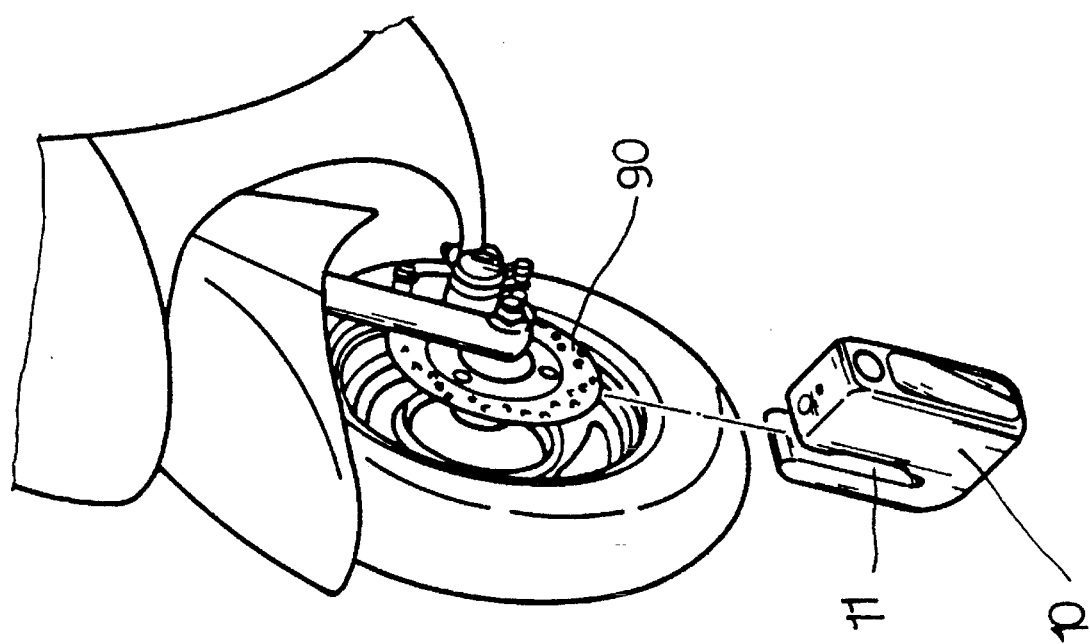
FIG. 1 is a perspective view illustrating the application of a locking device in accordance with the present invention.
Figure 2:
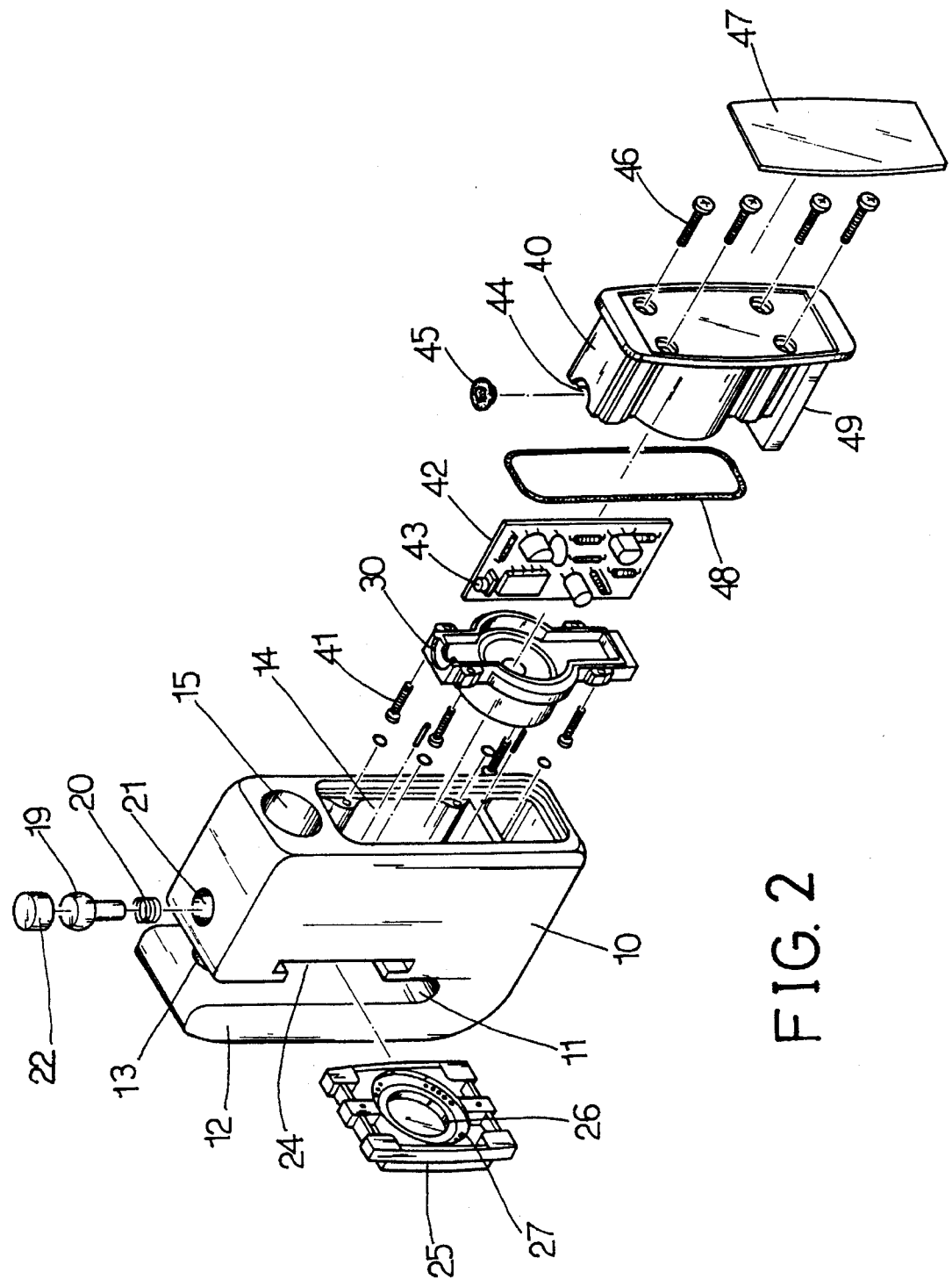
FIG. 2 is an exploded view of the locking device.
Figure 3:
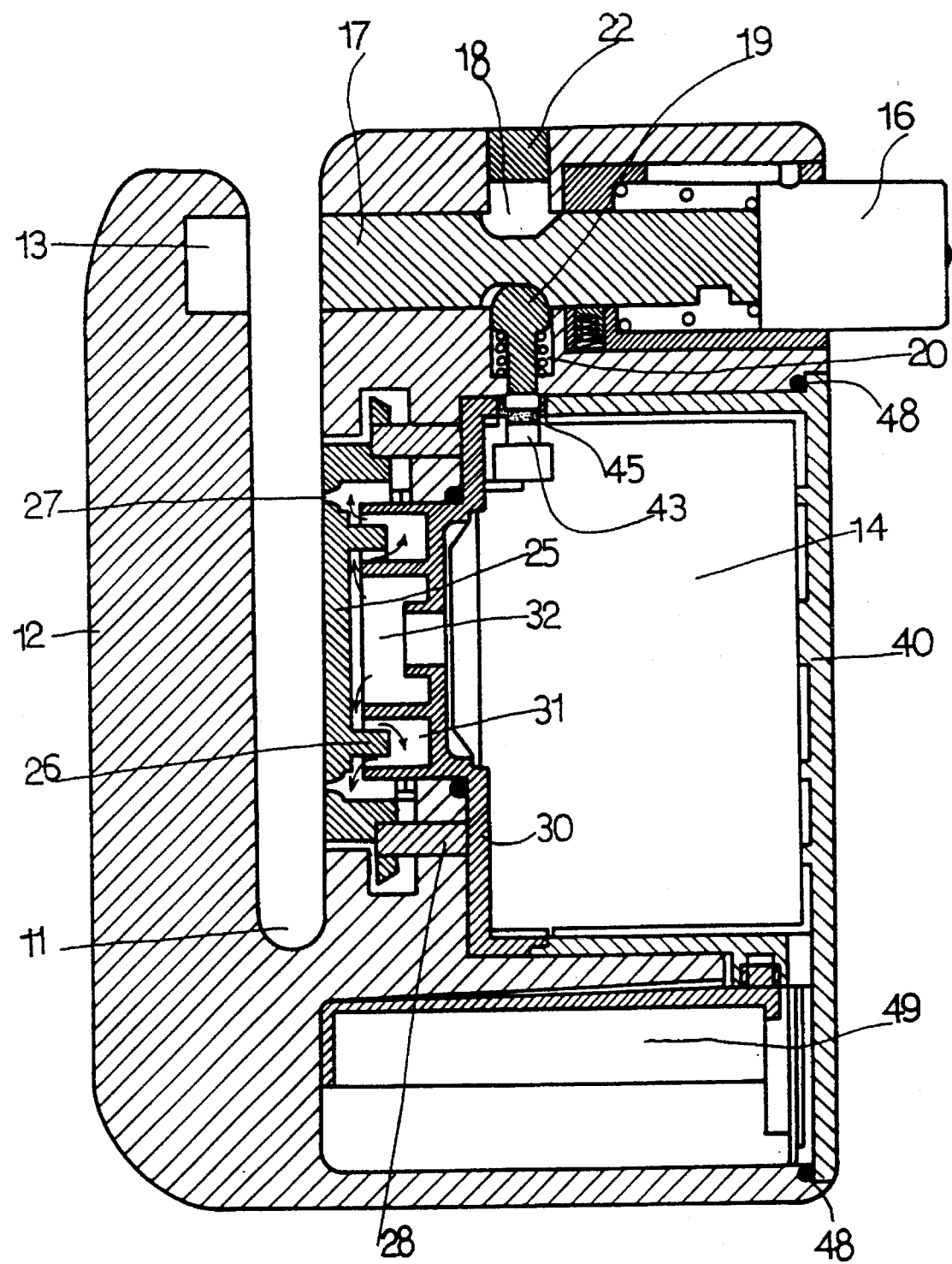
FIGS. 3 and 4 are cross sectional views illustrating the operation of the locking device.

Referring to the drawings, and initially to FIGS. 1 to 3, a locking device in accordance with the present invention is provided for locking a disk brake 90 of motor cycle and comprises a body 10 including a slot 11 formed therein for engaging with the disk brake 90 and so as to define a beam 12 which includes a depression 13 formed therein. The body 10 includes a chamber 14 formed therein for receiving a housing 40 and includes a groove 15 formed therein for slidably receiving a core 16 and a shank 17. The shank 17 includes a recess 18 formed therein for engaging with a stud 19 which is slidably engaged in the body 10 and located between the shank 17 and the chamber 14. The stud 19 may be engaged into the body 10 through a hole 21 which is then enclosed by a plug 22. A spring 20 is provided for biasing the stud 19 to engage with the shank 17.

The body 10 includes a channel 24 formed beside the slot 11 and communicating with the slot 11 for engaging with a cap 25 which includes an annular rib 26 extended toward the chamber 14 and which includes a number of orifices 27. The orifices 27 includes a small diameter that allows sound wave to pass therethrough and that prevents water from flowing therethrough. The cap 25 may be secured to the body 10 by pin elements 28.

The housing 40 is engaged in the chamber 14 and fixed to the body 10 by screws 46. A lid 47 is secured to the housing 40 for covering the screws 46. A sealing ring 48 is engaged between the body 10 and the housing 40 so as to form a water tight seal therebetween. The housing 40 includes a casing 49 for accommodating batteries therein and includes a cover 30 secured thereto by screws 41. A circuit board 42 is engaged in the housing 40 and includes a switch 43 provided therein. The housing 40 and the cover 30 include an opening 44 formed therein and aligned with the switch 43. A diaphragm 45 is engaged in the opening 44 so as to enclose the opening 44 and so as to prevent water from flowing into the chamber 14. The circuit board 42 may include a sensor for sensing vibrations or shocks transmitted to the body 10 similar to the alarming system for vehicles. The sensor of the alarming system is not related to the invention and will not be described in further details.

Figure 4:
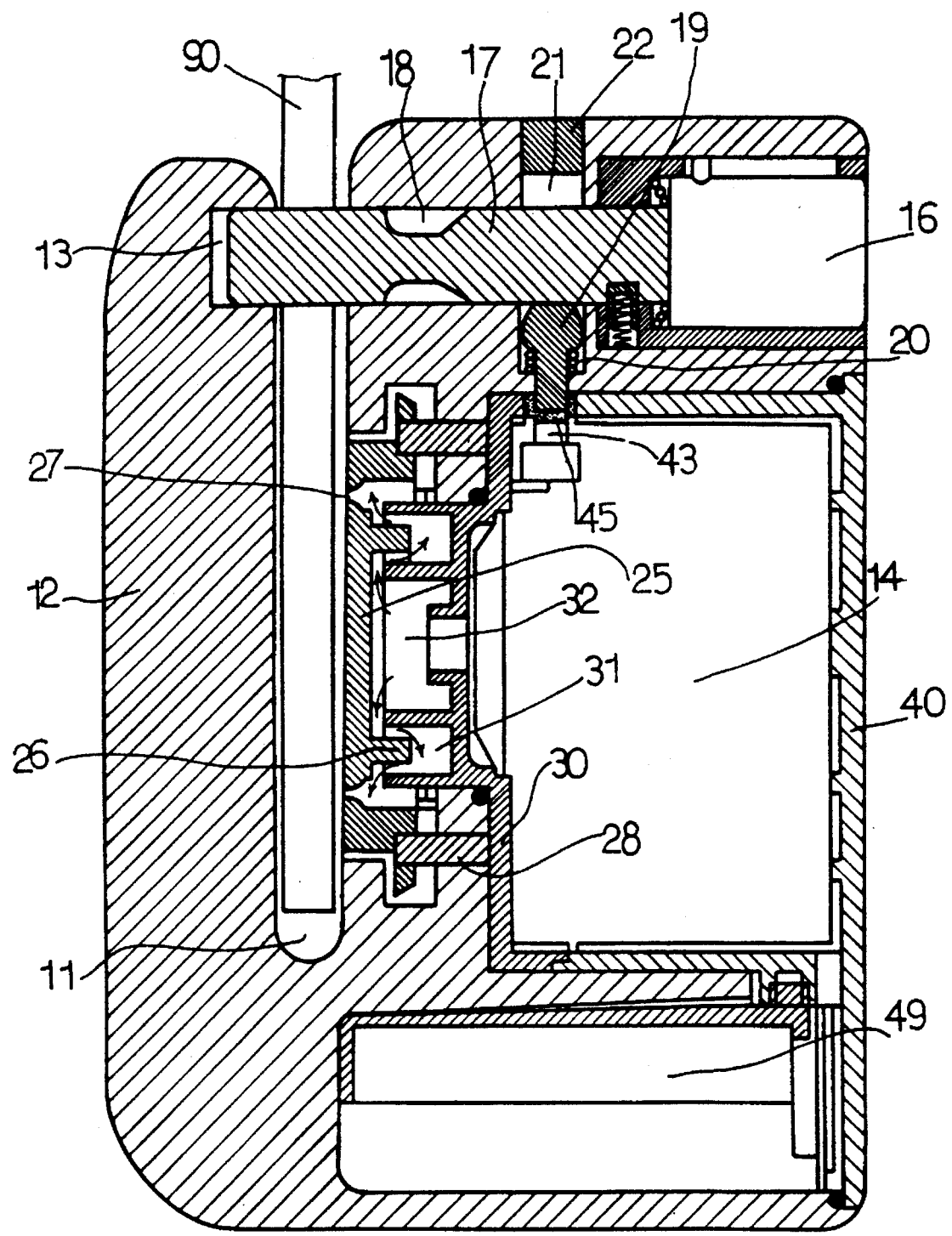

As shown in FIGS. 3 and 4, the cover 30 includes an annular space 31 formed therein for engaging with the annular rib 26 so as to form a tortuous passage, and includes a room 32 for receiving a speaker which is electrically coupled to the circuit board 42 for generating sounds. The sound generated by the speaker may be propagated outward of the body 10 through the tortuous passage formed between the annular space 31 and the annular rib 26 and through the orifices 27.

In operation, as shown in FIGS. 3 and 4, when the shank 17 is not engaged through the slot 11, the stud 9 may be biased to engage with the recess 8 of the shank 17. At this moment, the stud 19 is disengaged from the switch 43. When the shank 17 is engaged inward of the body 10 or engaged into the depression 13 of the beam 12, the stud 19 is moved downward against the spring 20 by the shank 17 so as to depress the switch 43. At this moment, the electric circuit of the electric board is switched on in order to energize the sensor. The sensor will generate a sound when sensing shocks or vibrations. For example, when an unauthorized person strikes or knocks the locking device, the speaker may generate a warning sound. When the locking device is opened and when the shank 17 is disengaged from the depression 13, the stud 19 may be biased to engage with the recess 18 so as to release the switch 43. At this moment, the electric circuit and the sensor will be switched off such that the speaker will not generate a warning sound.

Accordingly, the locking device in accordance with the present invention includes a speaker that may be energized to generate a warning sound when the locking device is opened by an unauthorized person. The locking device includes a sealing ring 48 for making a water tight seal between the housing 40 and the body 10, includes a diaphragm for enclosing the opening 44 and includes a cap which includes a number of orifices that allow the sound wave passing therethrough and that prevent water from passing therethrough; such that the electrical components may be suitably protected.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A locking device for locking a brake disk comprising:

a body including a slot for engaging with said brake disk, said body having a groove, and a chamber formed in said body;

a shank means slidably mounted in said groove, said shank means having a recess formed therein;

a housing mounted in said chamber;

a circuit board engaged in said housing, said circuit board having a switch;

a stud slidably engaged in said body and located between said shank means and said switch;

means for biasing said stud to engage with said recess of said shank means when said shank means is in an unlocking position; and said stud being disengaged from said switch when said stud is engaged in said recess of said shank means in said unlocking position, and said stud being forced toward said switch in order to depress said switch when said stud is disengaged from said recess of said shank means and when said shank means is moved inwardly of said body into said slot so as to lock said brake disk in place.

2. A locking device according to claim 1, wherein said housing includes an opening aligned with said switch and a diaphragm mounted to said housing and engaged in said opening so as to enclose said opening.

3. A locking device according to claim 1 further comprising a sealing ring engaged between said housing and said body so as to form a water tight seal therebetween.

4. A locking device according to claim 1, wherein said body includes a channel formed beside said slot and communicating with said slot, said chamber communicating with said channel, said body includes a cap engaged in said channel, said cap having at least one orifice formed therein, and said orifice includes a diameter small enough to prevent flowing of water therethrough.

5. A locking device according to claim 4, wherein said cap includes an annular rib extended toward said chamber, a cover mounted to and closing said housing, said cover includes an annular space and said annular rib being located in said annular space so as to form a tortuous passage in said body.

* * * * *